United States Patent
Rising, III et al.

(10) Patent No.: US 7,176,921 B2
(45) Date of Patent: Feb. 13, 2007

(54) GRAPHICAL REWRITING SYSTEM FOR MULTIMEDIA DESCRIPTIONS

(75) Inventors: Hawley K. Rising, III, San Jose, CA (US); Ali J. Tabatabai, Cupertino, CA (US); Mohammed Zubair Visharam, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 293 days.

(21) Appl. No.: 10/044,168

(22) Filed: Oct. 22, 2001

(65) Prior Publication Data

US 2002/0163518 A1 Nov. 7, 2002

Related U.S. Application Data

(60) Provisional application No. 60/305,008, filed on Jul. 11, 2001, provisional application No. 60/280,703, filed on Mar. 30, 2001, provisional application No. 60/280,608, filed on Mar. 30, 2001, provisional application No. 60/261,100, filed on Jan. 10, 2001, provisional application No. 60/242,278, filed on Oct. 20, 2000.

(51) Int. Cl.
*G06T 11/20* (2006.01)
(52) U.S. Cl. .................................................. 345/440
(58) Field of Classification Search ............... 345/440, 345/440.1, 440.2, 441, 442
See application file for complete search history.

(56) References Cited

U.S. PATENT DOCUMENTS

| | | | |
|---|---|---|---|
| 5,414,809 A * | 5/1995 | Hogan et al. ............... | 345/765 |
| 5,579,471 A | 11/1996 | Barber et al. | |
| 5,818,458 A * | 10/1998 | Saito ........................... | 345/441 |
| 5,841,900 A * | 11/1998 | Rahgozar et al. ........... | 382/176 |
| 5,999,162 A * | 12/1999 | Takahashi et al. ........ | 345/440.1 |
| 5,999,188 A * | 12/1999 | Kumar et al. ............... | 345/423 |
| 6,084,590 A * | 7/2000 | Robotham et al. .......... | 345/419 |
| 6,108,676 A * | 8/2000 | Nakatsuyama .............. | 715/522 |
| 6,128,606 A * | 10/2000 | Bengio et al. ............... | 706/10 |
| 6,256,618 B1 * | 7/2001 | Spooner et al. ............. | 706/13 |
| 6,278,462 B1 * | 8/2001 | Weil et al. ................... | 345/619 |
| 6,492,997 B1 | 12/2002 | Gerba et al. | |
| 6,502,105 B1 * | 12/2002 | Yan et al. .................. | 707/104.1 |
| 6,564,263 B1 * | 5/2003 | Bergman et al. ............ | 709/231 |
| 6,807,583 B2 * | 10/2004 | Hrischuk et al. ........... | 719/318 |

(Continued)

OTHER PUBLICATIONS

Similarity searching in medical image databases, Petrakis, E.G.M.; Faloutsos, A.; Knowledge and Data Engineering, IEEE Transactions on , vol. 9 , Issue: 3 , May-Jun. 1997 , pp. 435-447.*

(Continued)

*Primary Examiner*—Kee M. Tung
*Assistant Examiner*—J. Amini
(74) *Attorney, Agent, or Firm*—Blakely, Sokoloff, Taylor & Zafman, LLP

(57) ABSTRACT

Graphs representing multimedia content are validated and modified through graph matching and graph rewriting techniques using pre-defined model graphs. In one aspect, an input graph is validated against a model template graph. In another aspect, suggestions for modifying an input graph are provided based on model alphabet, rule and morphism graphs. The resulting graphs may represent queries against existing description schemes or new description schemes.

27 Claims, 11 Drawing Sheets

U.S. PATENT DOCUMENTS

2002/0032697 A1* 3/2002 French et al. .............. 707/500.1
2002/0059290 A1* 5/2002 Rising, III ................... 707/102
2003/0041047 A1* 2/2003 Chang et al. ................... 707/1

OTHER PUBLICATIONS

Graph Rewrite systems for program optimization, UWE Assmann, ACM vol. 22, No. 4, Jul. 2000, pp. 583-637.*

Similarity searching in medical image databases, Petrakis, E.G.M.; Faloutsos, A.; Knowledge and Data Engineering, IEEE Transactions on vol. 9, Issue 3, May-Jun. 1997 pp. 435-447.*

ACM Transaction onProgramming Languages and Systems, vol. 16, No. 3, May 1994,pp. 493-523.*

A Model for Distributed Systems Based on Graph Rewriting, Journal of the Association for Computing Machinery, vol. 34, No. 2, Apr. 1987, 41 I-449.*

A Needed Narrowing Strategy, Journal of the ACM, vol. 47, No. 4, Jul. 2000, pp. 776-822.*

Linear Behaviour of Term Graph Rewriting Programs, 1995 ACMPP. 157-163.*

Barendregt, An Intermediate Language Based on Graph Rewriting, 1988/89, pp. 163-177.*

Rising, Hawley et al.; "Workplan for CE on Graph Rules, Classification Schemes, And Restrictions"; *ISO/IEC JTC1/SC29/WG11*; MPEG00/N3632; La Baule; Oct. 2000; pp. 1-4.

Rising, Hawley et al.; Report On Ce On Graph Rules, Classification Schemes, and Restrictions; *ISO/IEC JTC1/SC29/WG11*; MPEG00/M7138; Singapore; Mar. 2001; 40 pages.

* cited by examiner

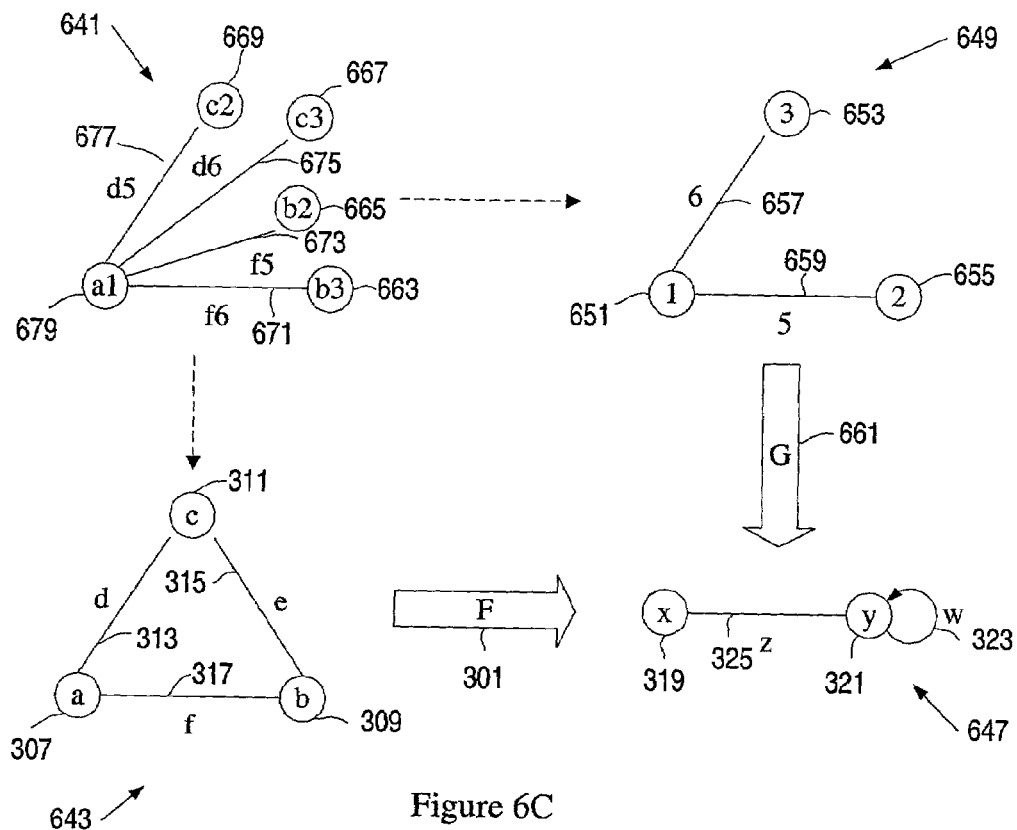
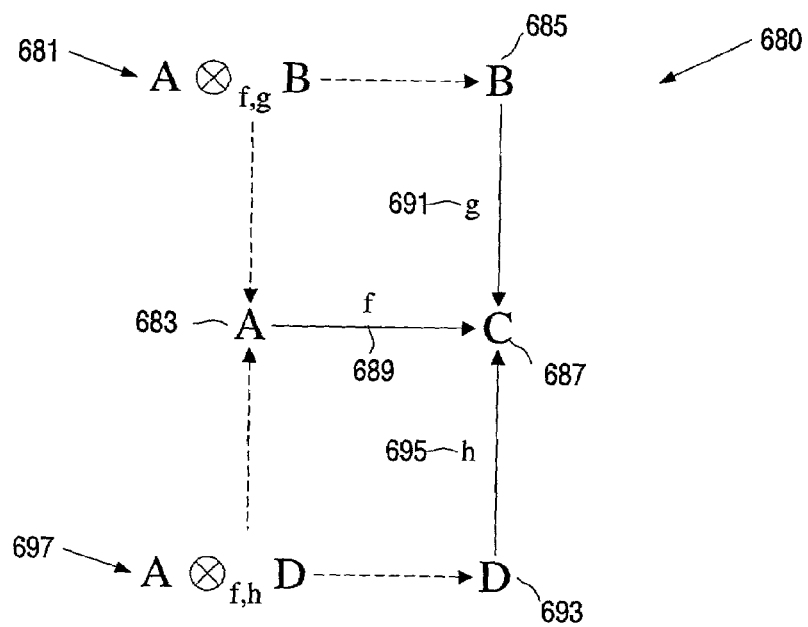
Figure 6C
Figure 6D

GRAPHICAL REWRITING SYSTEM FOR MULTIMEDIA DESCRIPTIONS

RELATED APPLICATIONS

This application claims the benefit of U.S. provisional applications Ser. Nos. 60/242,278 filed on Oct. 20, 2000, 60/261,100 filed on Jan. 10, 2001, 60/280,608 and 60/280,703 both filed on Mar. 30, 2001 and 60/305,008 filled on Jul. 11, 2001, and which are herein incorporated by reference.

FIELD OF THE INVENTION

This invention relates generally to descriptions for multimedia content, and more particularly to graphical representation of such descriptions.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Sony Electronics, Inc., All Rights Reserved.

BACKGROUND OF THE INVENTION

Digital multimedia content is becoming widely distributed through broadcast transmission, such as digital television signals, and interactive transmission, such as the Internet. The content may be still images, audio feeds, or video data streams. However, the enthusiasm for developing multimedia content has led to increasing difficulties in managing, accessing and identifying such a large volume of content. Furthermore, complexity and a lack of adequate indexing standards are problematic.

The Moving Picture Experts Group (MPEG) has promulgated a Multimedia Content Description Interface, commonly referred to as MPEG-7, to standardize the description of multimedia content when it is transmitted from a system that generates the content to a system that presents the content to a user. In contrast to preceding MPEG standards such as MPEG-1 and MPEG-2, which relate to coded representation of audio-visual content, MPEG-7 is directed toward representing information relating to content, and not the content itself. The MPEG-7 standard seeks to provide a rich set of standardized tools for describing multimedia content, with the objective of providing a single standard for creating interoperable, simple and flexible solutions for indexing, searching and retrieving multimedia content.

More specifically, MPEG-7 defines and standardizes a core set of "descriptors" for describing the various features of multimedia content; "description schemes" for describing relationships among the descriptors, the descriptors and other description schemes, and among description schemes; and a "description definition language" (DDL) for defining the description schemes and descriptors. The descriptions and description schemes for a particular type of multimedia content are encoded into a DDL-based schema. Each descriptor entry in the schema specifies the syntax and semantics of the corresponding feature. Each description scheme entry in the schema specifies the structure and semantics of the relationships among its children components.

For example, a standard movie includes scenes, shots within scenes, titles for scenes, and time, color, shape, motion, and audio for shots. The corresponding schema would contain descriptors that describe the features of the content, such as color, shape, motion, audio, title, etc., and one or more description schemes, e.g., a shot description scheme that relates the features of a shot, and a scene description scheme that relates the different shots in a scene and relates the title of the scene to the shots.

A description scheme can be represented by a graph in which each descriptor and nested description scheme corresponds to a node, with the relationships among the descriptors and description schemes corresponding to the edges of the graph. Working with the graphical representations instead of the description schemes themselves introduces an additional level of abstraction that can make searching for, and modification of, description schemes more efficient. However, the graphs are generally complex and creating valid and efficient graphs will be difficult for most users.

SUMMARY OF THE INVENTION

Graphs representing multimedia content are validated and modified through graph matching and graph rewriting techniques using pre-defined model graphs. In one aspect, an input graph is validated against a model template graph. In another aspect, suggestions for modifying an input graph are provided based on model alphabet, rule and morphism graphs. The resulting graphs may represent queries against existing description schemes or new description schemes.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 6A–E illustrate pullback rewriting techniques employed by the modification method of FIG. 4;

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1:
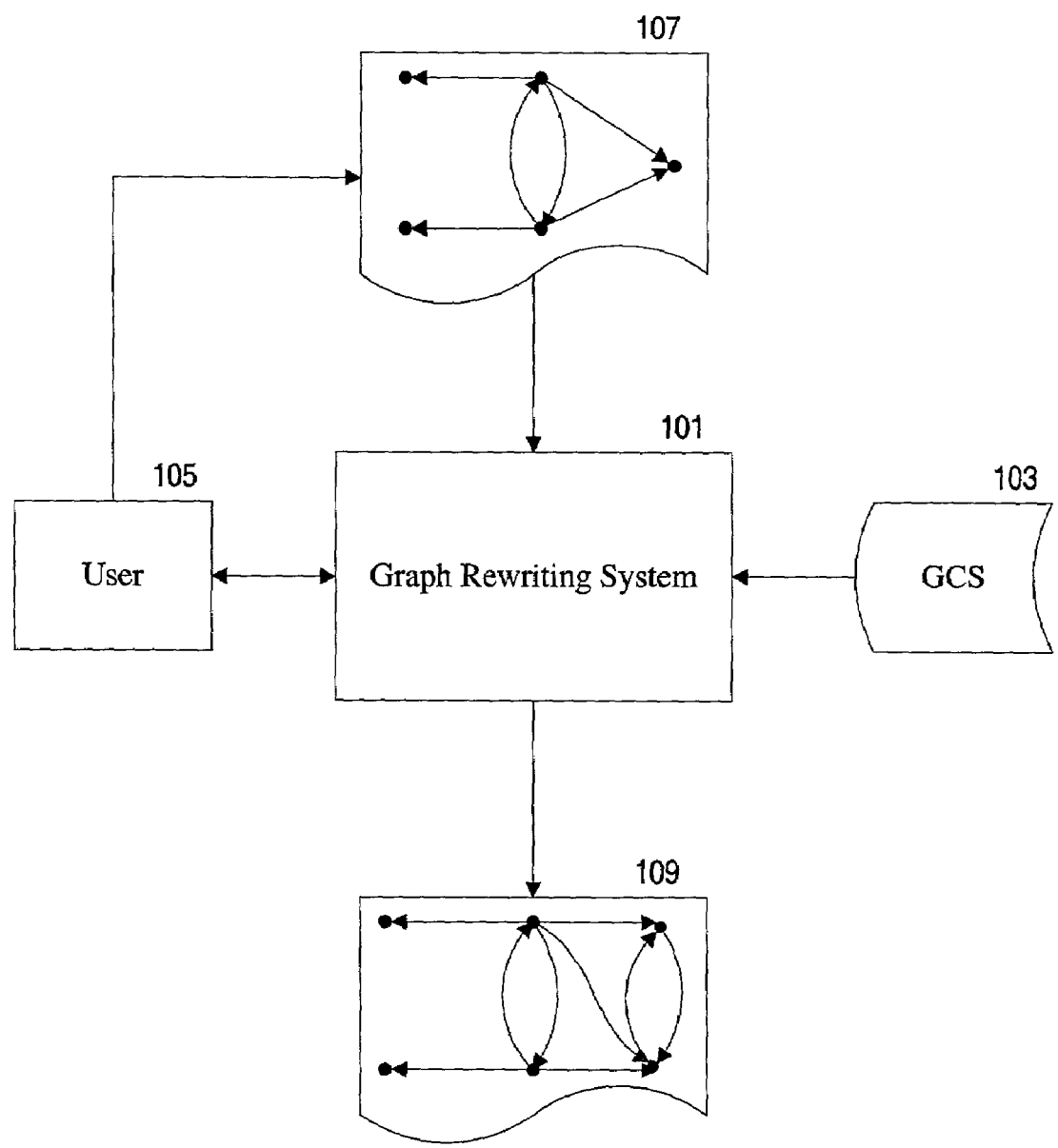
FIG. 1 is a diagram illustrating a overview of the operation of an embodiment of a graphical rewriting system according to the invention.

Beginning with an overview of the operation of the invention, FIG. 1 illustrates one embodiment of a graph rewriting system 101 that validates input graphs 107 and also suggests changes to an input graph 107 to aid a user 105 in creating a graph 109 to search or modify a description scheme for multimedia content. A list of model graphs, referred to as graphical classification schemes (GCS) 103, constrain the nodes and the arrangement of edges for the description schemes. The model graphs in the GCS 103 are used to validate input graphs 107 that represent user searches (queries) for, or modifications to, an existing description scheme. Because of the difficulty in creating a graph that represents a complex query or a description scheme, the user 105 may not be able to construct an valid and efficient input graph without assistance. The model graphs in the GCS 103 also can be used to generate suggested changes to a sample input graph that will result in the desired graph 109.

Validation of an input graph 107 is accomplished using graph matching techniques. Correspondences are created between the input graph 107 and model template graphs in the GCS 103. If all parts of the input graph 107 can be built from the template graphs, the graph is valid and the query can be run or the modified description scheme can added to the GCS 103 for subsequent use.

When the user 105 wants to modify a sample input graph, such as graph 107, the sample input graph is matched against model alphabet graphs in the GCS 103. If a match is found, rules associated with the matching alphabet graph may be applied to the input graph 107 to assist the formulation of a more complex graph 109. The rules are expressed in terms of model rule and morphism graphs stored in the GCS 103, and the input graph is revised accordingly through graph rewriting techniques. The revised input graph is matched against the alphabet graphs and the process repeated until the user is satisfied with the resulting graph.

Figure 8:
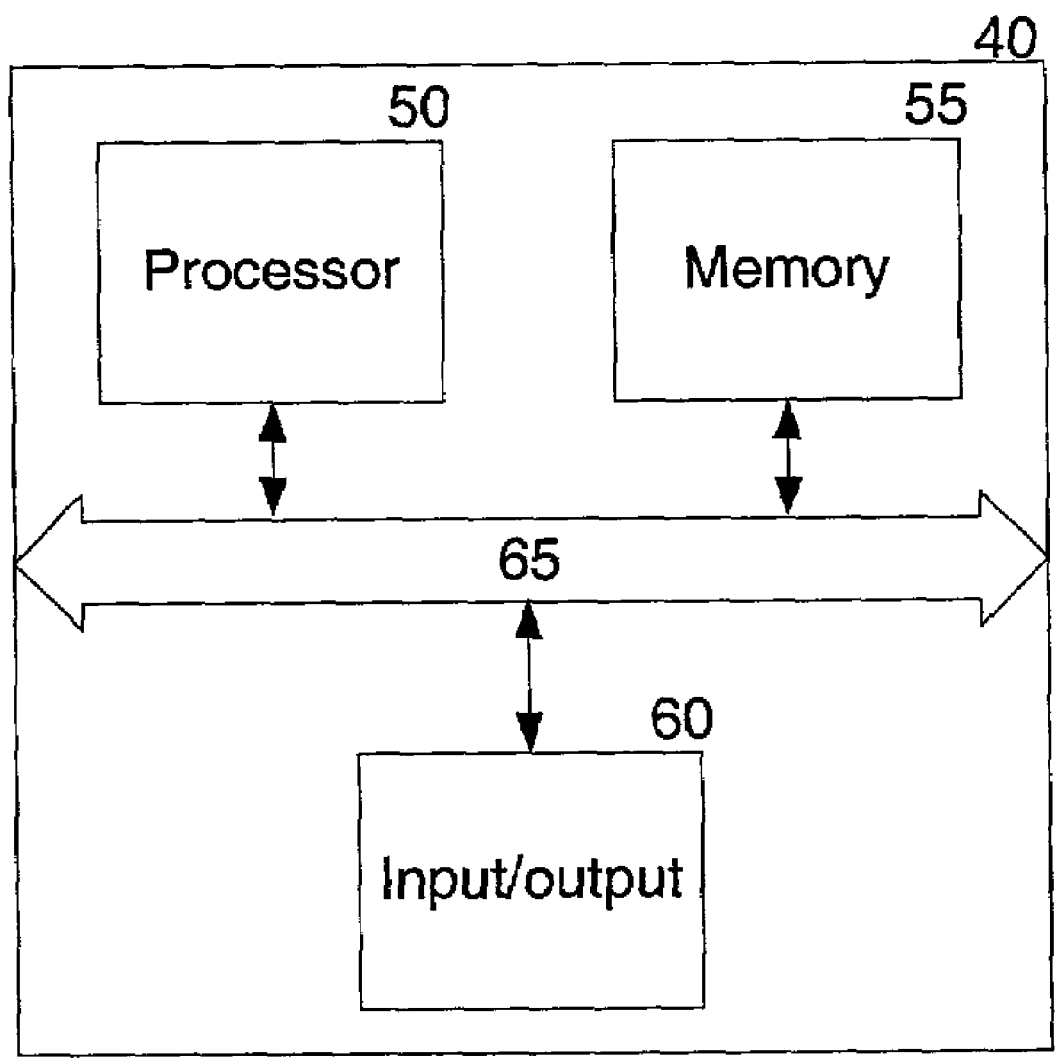
FIG. 8 is a diagram of a computer environment suitable for practicing the invention.

The graph rewriting system 101 may be implemented on a stand-alone user computer or may be implemented on a server or servers coupled to the user through a network. One embodiment of an applicable computer environment is illustrated in FIG. 8 and described further below.

The graph rewriting system 101 uses graph matching in validating an input graph and in rewriting a graph. The input graph 107 consists of a node list and an edge list. The node list may include node types and the edge list may include edge labels. The node list may be optional as it can be derived from the edge list in some cases. In one embodiment, an input graph is compared against model GCS graphs node by node and edge by edge using node types and edge labels. A starting, single edge in the input graph is matched by checking the type or instantiations of the nodes at each end of each edge, along with the label of the edge itself, against the model graphs. Generally, a graph is matched to template graphs when validating an input graph and to alphabet graphs when rewriting an input graph. A template graph acts as a template for the formation of descriptions that fit a particular model, and thus can be used to verify that a particular graph is of a particular template type. An alphabet graph specifies how an input graph is to be interpreted during the rewriting process.

Figure 2:
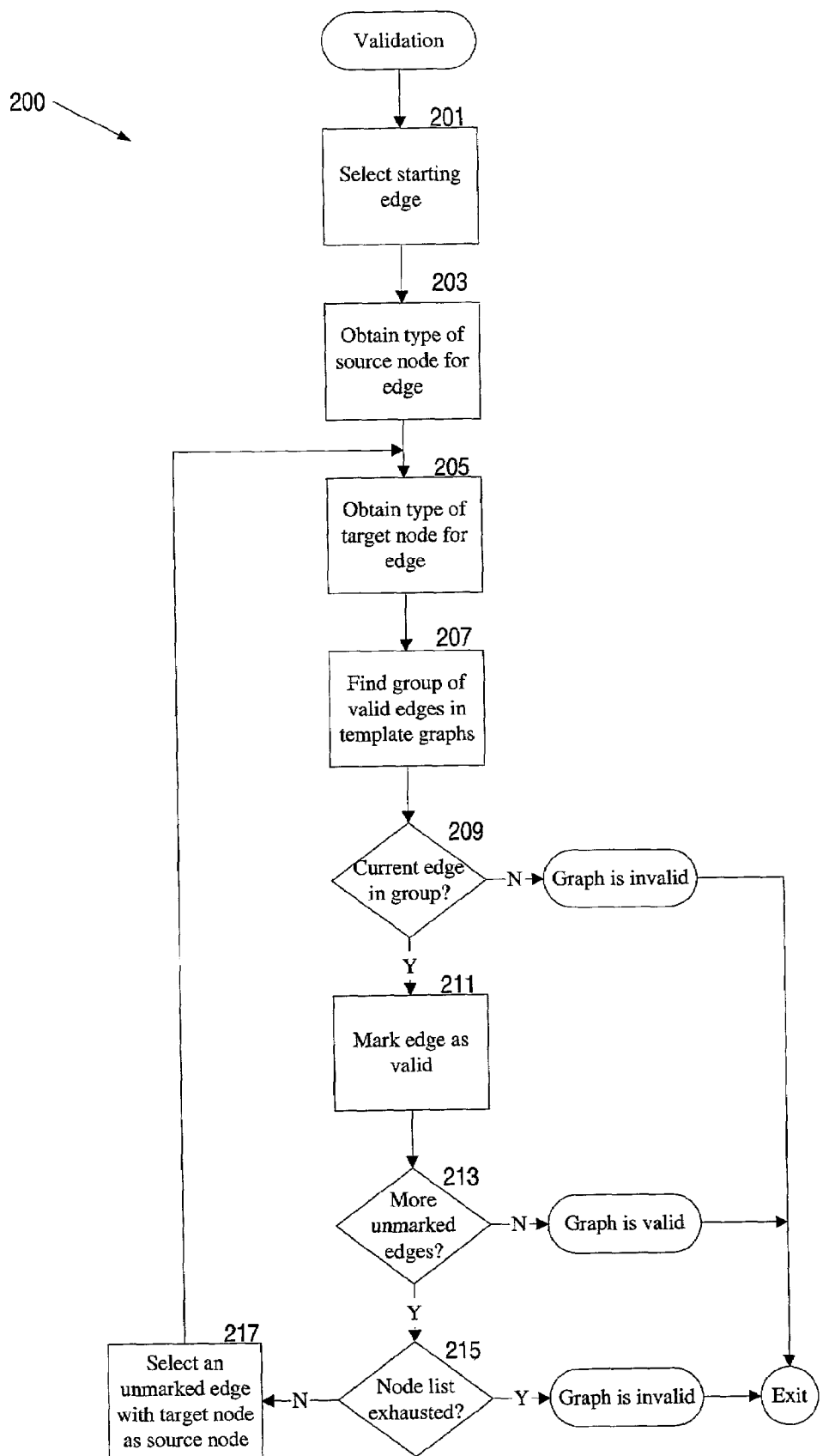
FIG. 2 is a flow diagram of a validation method performed by the graphical rewriting system of FIG. 1.

A validation method 200 that can executed by a computer to compare input and template graphs is illustrated in FIG. 2. A starting edge is selected at block 201. The type of the source node for the edge is obtained at block 203 and the type of the target node at block 205. A lexicographical search is performed at block 207 to find the group of valid edges in the template graphs that match the source and target nodes, i.e., the subgraphs formed by the source and target nodes. If the current edge appears in the group (block 209), the edge is valid and is marked (block 211). Another unmarked edge is selected that has the current target node as its source node (block 217) and the validation method 200 loops back to block 205. The method 200 continues until every edge is marked (block 213), meaning the input graph is valid, or until the node list is exhausted (block 215) or an edge is not valid (block 209), meaning the input graph is invalid.

Figure 3A:
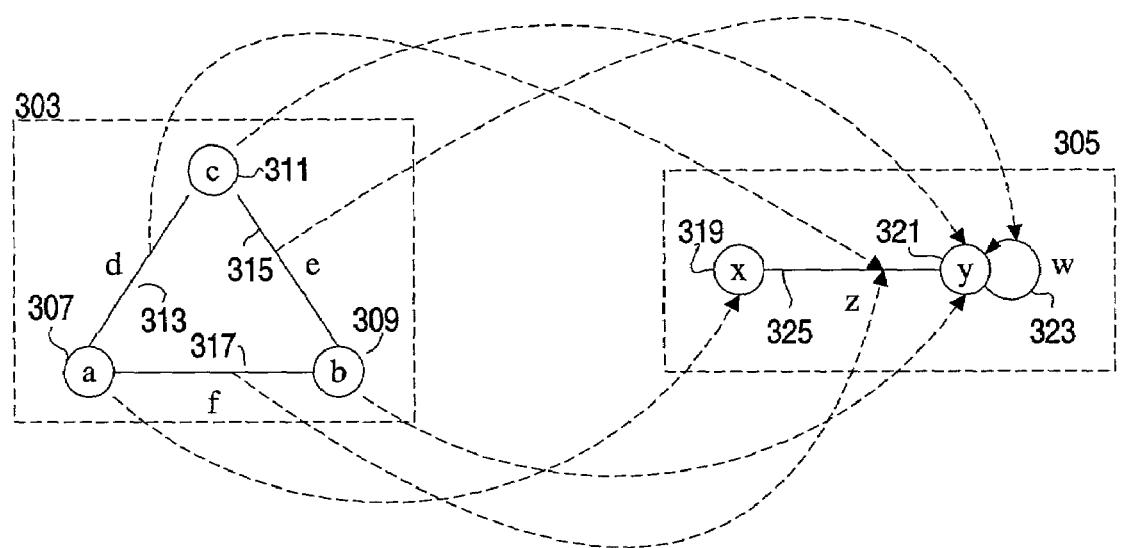
FIG. 3A illustrates one embodiment of a graph matching technique employed by the validation method of FIG. 2.

An example of node and edge matching is shown in FIG. 3A in which correspondences between the nodes and edges of an input graph 303 and a template graph 305 are illustrated by dashed lines. Node a 307 in input graph 303 corresponds to node x 319 in template graph 305. Nodes b 309 and c 311 correspond to node y 321. Edges d 313 and f 317 correspond to edge z 325 and edge e 315 corresponds to edge w 323. Note that the endpoints of the edges d 313, e 315, and f 317 in the input graph 303 also correspond to the appropriate endpoints of edges w 323 and z 325 in the template graph 305. Thus, the input graph 303 is valid because it can be built from the template graph 305.

Because exact matching may prove inefficient for large graphs, approximation techniques may be used to match the input and template graphs. To simplify the process further, the labels on the edges are initially discarded. In one embodiment, the input and template graphs are matched using matrix functions on "adjacency matrices" that represent the graphs. For any graph, the corresponding adjacency matrix α contains rows and columns labeled for the nodes of the graph. If two nodes, i and j, have no edge connecting them, the value of $\alpha_{ij}$ is zero, otherwise the value is a positive number. Commonly, a value of one is used to designate that the node pair forms the endpoints of an edge. Other values may be used to denote the length of the edge. Undirected graphs have symmetrical matrices.

As an example, the adjacency matrix for the input graph 303 and the template graph 305 of FIG. 3A are shown in Tables 1-A and 1-B, respectively. Note that edge w 323 is a directed edge having node y 321 as both its endpoints, which causes the adjacency matrix for the template graph 305 to be asymmetric.

TABLE 1-A

| I | a | b | c |
|---|---|---|---|
| a | 0 | 1 | 1 |
| b | 1 | 0 | 1 |
| c | 1 | 1 | 0 |

TABLE 1-B

| T | x | y |
|---|---|---|
| x | 0 | 1 |
| y | 1 | 1 |

The matching between the adjacency matrices may be accomplished through several techniques. In one embodiment, a permutation matrix is created that, when multiplied by the graph adjacency matrix for the input graph, gives the best match with a graph adjacency matrix for a template graph. The match is then the best match between the input graph and the template graph, using the permutation that brings them closest together. In another embodiment, a "least squares" algorithm is used to find the best match.

Once the best match has been determined, the edge labels are checked as in the simplistic approach to finish the validation.

What constitutes a best match may be determined by measuring the distances among the matching points in the adjacency matrices. Different distance measures are used for different types of matches. For example, if the entire input graph is matched against the template graphs, the best match is based on global distance measured among the elements of the adjacency matrices.

Because large, complex graphs are composed of a series of more simplistic subgraphs, adjacency matrices for the subgraphs of the input graph may be matched against adjacency matrices for the subgraphs of the template graphs using closest point matches. In still another embodiment, singular valid decomposition (SVD) transformations are applied to the adjacency matrices to create less sparse matrix approximations that can be more efficiently tested for matches.

Figure 4:
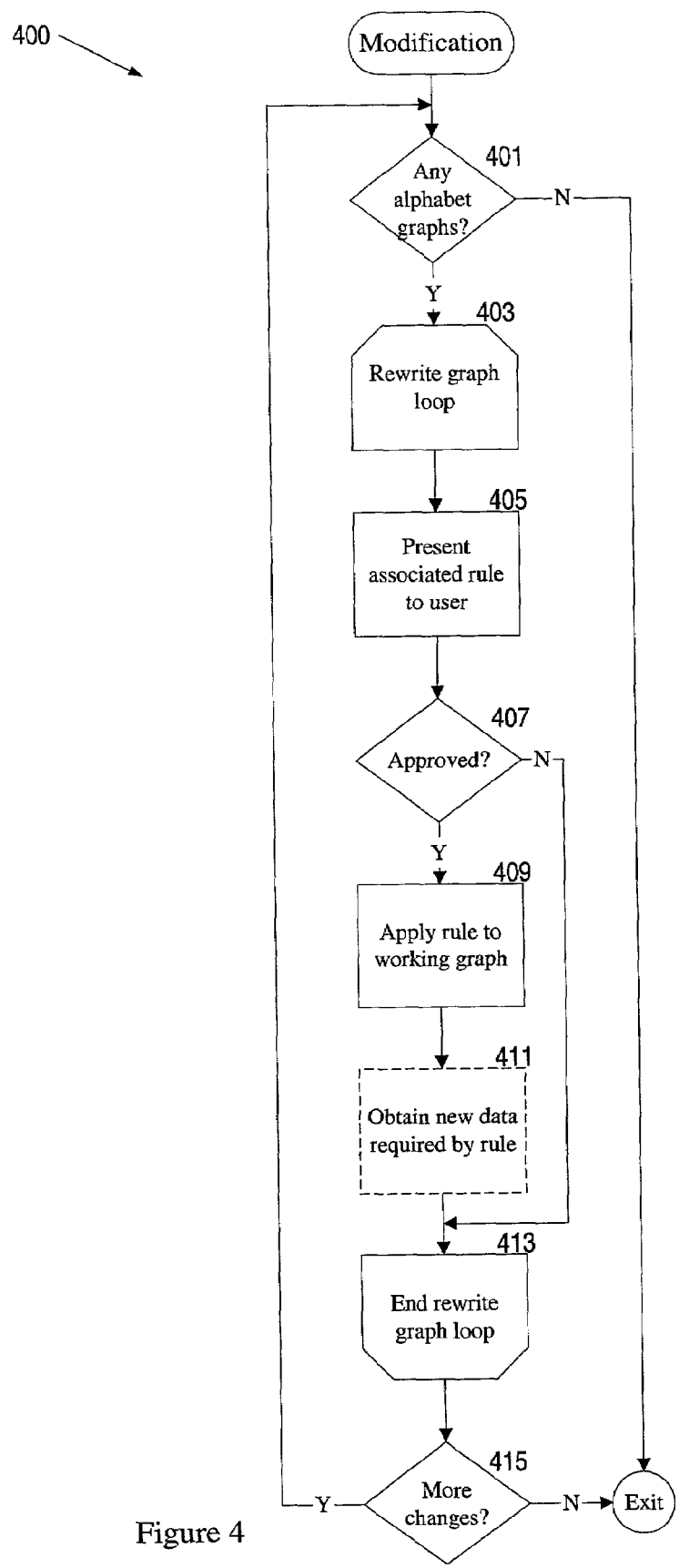
FIG. 4 is a flow diagram of a modification method performed by the graphical rewriting system of FIG. 1.

Graph rewriting is the process of combining graphs, replacing nodes with graphs, replacing edges with more complex configurations, and generating series of "production steps" to move from one graph to another. A modification method 400 that can be executed by a computer to rewrite a graph is illustrated in FIG. 4. Graph matching as described above is used to determine matches between the working graph (initially the input graph) and the alphabet graphs. If there are any matches (block 401), the method 400 performs a rewrite graph loop for each matching alphabet graph starting at block 403 and ending at block 413. The rule graph associated with the alphabet graph is presented to the user (block 405) and, if approved (block 407), is applied to the working graph (block 409) using an algebraic graph grammar as described further below to create a new working graph. In an alternate embodiment, the graph grammar processing represented by block 409 reduces each graph to text strings, and rewrites the text strings to the new working graph. Because description schemes are typically directed acyclic graphs (forests of trees) and attempting to map a text string back to an acyclic graph often results in infinite trees, this alternate embodiment requires additional processing at block 409 to avoid such infinite loops.

If the approved rule graph requires new data, the method 400 obtains the data from the user (block 411). If a rule graph is not approved (block 407), the method 400 continues the rewrite graph loop with the next rule graph.

The working graph created by the rewrite graph loop can be further modified, if desired (block 415), by returning to block 401 to find further applicable alphabet graphs. If no further changes are desired at block 415, or if no alphabet graphs are found in the graph matching process at block 401, the modification method 400 exits. The graph resulting from the modification method 400 can be applied or stored, as desired.

Figure 3B:
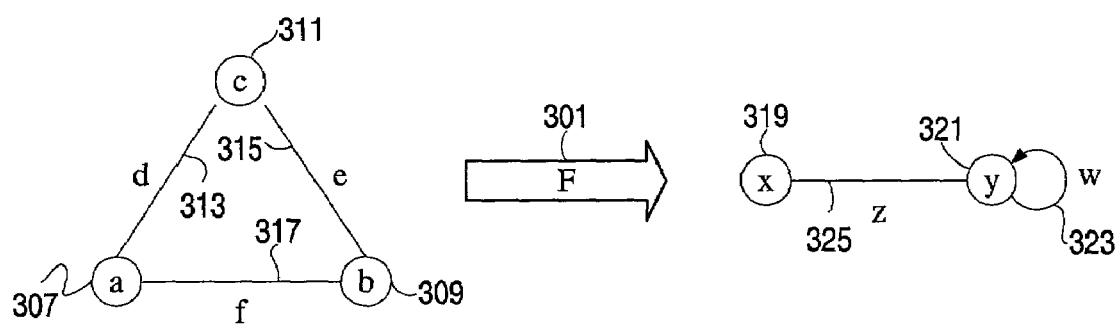
FIG. 3B illustrates a mapping between graphs according to one embodiment of the invention.

Algebraic graph grammars are based on category theory, in which the nodes and edges of a graph, or whole graphs, are treated as objects, and functions, relations, or mappings, called morphisms, are defined that map from the objects in a domain graph to the like objects in an image graph. Returning now to FIG. 3A, the correspondences between the nodes and edges in the input (domain) graph 303 and the nodes and edges in the template (image) graph 305 create a morphism F 301 as illustrated in FIG. 3B. Morphism F 301 can be represented as a morphism graph in which the morphism nodes are the nodes and edges of the domain 303 and image 305, and morphism edges are the correspondences from the domain graph 303 to the image graph 305.

Two particular operations in algebraic graph grammars are suitable to build graph rewriting techniques for description scheme graphs: pushout and pullback. Pushouts and pullbacks can be thought of as sums and products, respectively. A pushout takes the elements of a common piece between two graphs and uses those elements to glue the graphs together. A variation, called a double pushout operation (DPO), performs a cut and paste operation on the graphs. A pullback takes the elements of two graphs that map to elements in a third graph and computes all the combinations of these elements. Given an input graph and the appropriate alphabet, rule and morphism graphs, there is a pullback operation equivalent to each double pushout, but there are some operations, involving the creation of graph elements for which there is only a pullback operation, no double pushout.

Figure 5A:
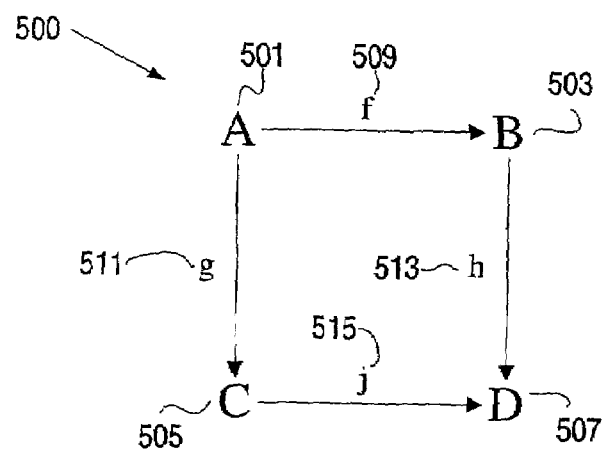
FIGS. 5A–D illustrate pushout rewriting techniques employed by the modification method of FIG. 4.
Figure 5B:
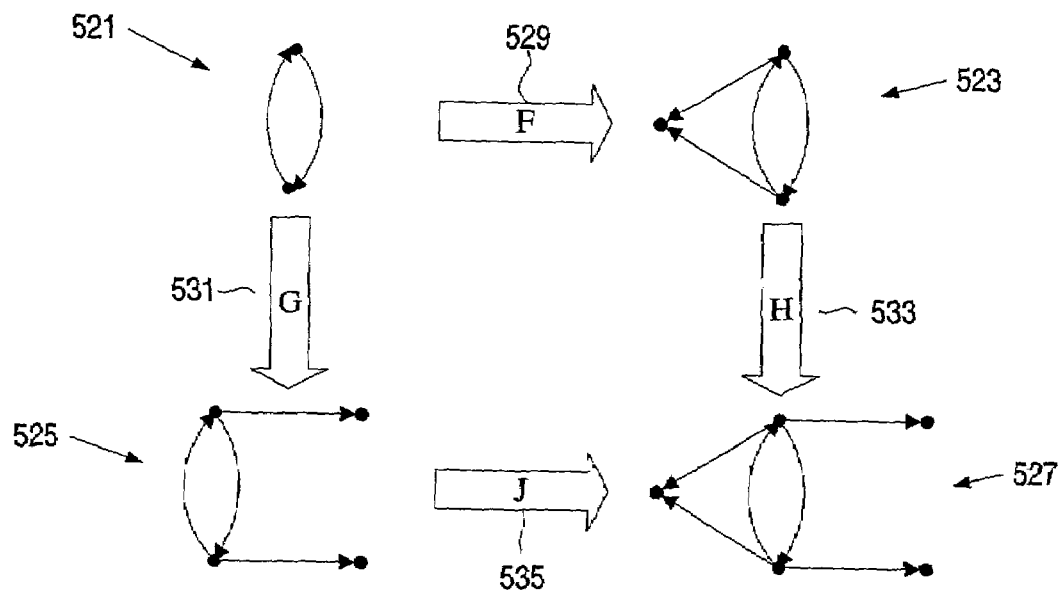

An exemplary pushout operation 500 is shown in FIG. 5A. Morphisms f 509 and g 511 are used to map from a graph A 501 to a graph B 503 and a graph C 505, respectively. To complete the pushout rule 500, morphisms h 513 and j 515 are found to join the graph B 503 and the graph C 505 together along their common portions defined by the graph A 501. In an example shown in FIG. 5B, a pushout operation is applied to input graph 525 through an alphabet graph 521. Rule graph 523 is associated with the alphabet graph 521 and is thus "glued" onto the input graph 525 at the common portion defined by the alphabet graph 521 to create output graph 527. Referring back to FIG. 5A, in one embodiment, the rule graph B 503, the alphabet graph A 501, and the morphism graph for morphism h 513 are stored in the graphical classification scheme, while the morphism j 515 is part of the instantiation or application of the production rule.

Figure 5C:
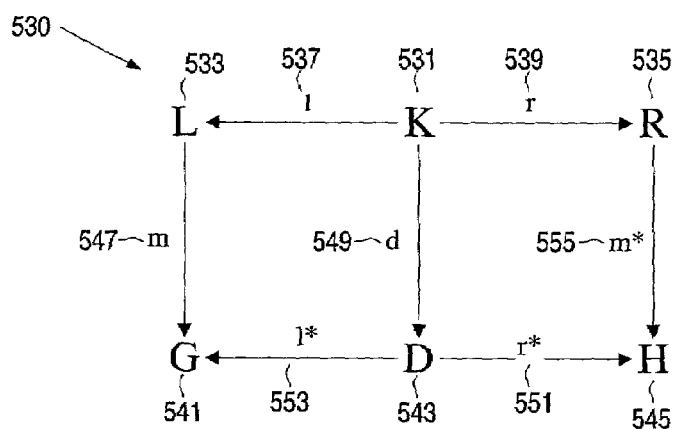

FIG. 5C illustrates a double pushout operation 530. Given a starting graph L 533, K 531 is the context part in which the nodes and edges will be preserved in the result graph R 535. A morphism l 537 and morphism r 539 are used to map from K to L and k to R, respectively, and form a production rule. To apply the double pushout to an input graph G 541, a graph morphism m 547 is found that maps from graphs L 533 to G 541, with the restriction that no element in G 541 is the target of two elements in L 533, one of which is in the image of K 531 and the other is not. Assuming such a morphism m 547 can be found, then a morphism d 549 can be inferred that maps from K 531 to a graph D 543, completing the first pushout square as previously illustrated in FIG. 5B. Once D 543 is created, a morphism r* 551 is found that maps from D 543 to the output graph H 545, completing the second pushout square, which applies the rule 530 to the input graph 541 to produce the desired output graph 545.

Figure 5D:
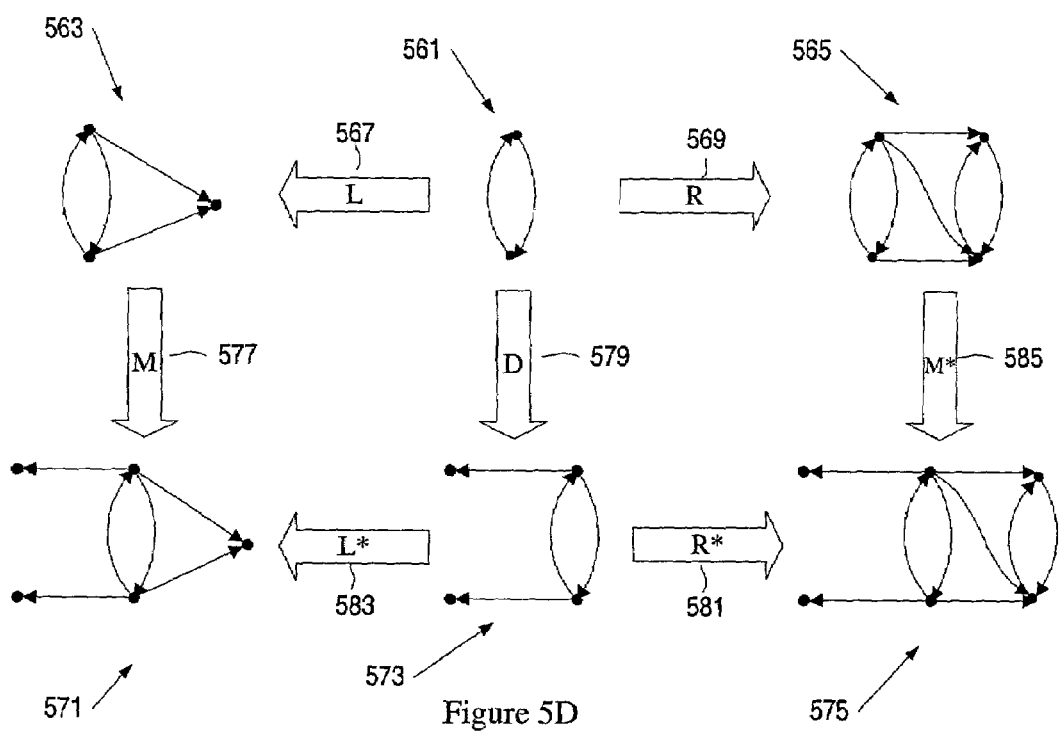

The application of the double pushout operation 530 can be viewed as a cut and paste process as illustrated in FIG. 5D using the input and resulting graphs from FIG. 1. The production rule specifies that starting graph 563 has everything cut away except the common part defined by graph 561. The part of graph 565 that interfaces with graph 561 is pasted onto the remaining portion of graph 563 using morphism R 569. When the production rule is applied to input graph 571, morphism M 577 specifies which parts of the input graph 571 will be discarded and which parts will be retained in the resulting graph 575. The smallest mapping M* 585 of graph 565 to the retained portion of graph 571 is pasted onto the retained portion of graph 571 to produce the output graph 575. Referring again to FIG. 5C, in one embodiment, the graphs L 533, K 531, and R 535 are stored in the graphical classification scheme, together with the morphism graphs for morphisms l 537 and r 539. Graphs L 533 and R 535 are stored as rule graphs and K 531 as an alphabet graph. The morphism m is instantiated as necessary to apply the production rule to the input graph G 541.

A variation of the DPO creates a pushout cube from the original rule, which creates a new implied rule. It is from this new rule that the result of the production step is inferred. The DPO essentially deletes old material, and then appends new material. The DPO variation appends the new material first, then deletes the old material. If a node is deleted in a tree, everything below it disappears. Because the pushout cube variation appends first, it avoids resending of old data.

Figure 6A:
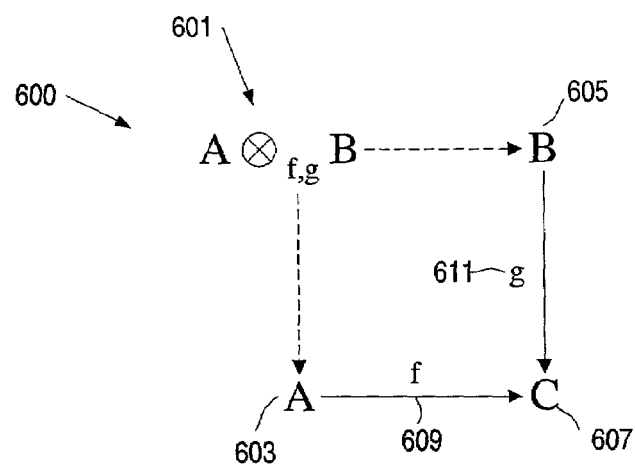

Pullback grammars have considerable advantages over pushout grammars when used with infinite graphs. This is important for applications, such as description schemes, because pullback grammars are applicable to changes on a graph that do not specify the entire start and finishing graphs as is required by DPO. Often an infinite graph is a good model for an embedded graph when the context into which it is embedded is not known. In a pullback as illustrated in FIG. 6A, a final graph 601 is produced from an alphabet graph C 607, and two mappings (morphism f 609 and morphism g 611) from the starting graph A 603 and a rule graph B 605 to the alphabet graph C 607. The final graph 601 graph has as its nodes the product nodes of the graphs A 603 and B 605 (often equated with the nodes of one or the other), and as edges the product edges of the two graphs, as a result of the fibered product of the two graphs.

A fibered product is a subset of a tensor product. Assuming the nodes and edges in graph A 603 are represented as a set of elements $\{a_1, a_2, \ldots, a_n\}$ and the nodes and edges of graph B 605 as a set of elements $\{b_1, b_2, \ldots b_k\}$, the tensor product $A \otimes B$ is defined by attaching a copy of each element in B to each element in A, thereby producing $\{a_1b_1, a_1b_2, \ldots, a_1b_k\}$
$\{a_2b_1, a_2b_2, \ldots, a_2b_k\}$
.
.
.
$\{a_nb_1, a_nb_2, \ldots a_nb_k\}$.

The tensor product may be thought of as a set of fibers (vectors, in this case) over the set A 603, in which each fiber is in one-to-one correspondence to B 605, and corresponds to one value in A 603, i.e.

$a_1\{b_1, b_2, \ldots, b_k\}$
$a_2\{b_1, b_2, \ldots, b_k\}$
.
.
.
$a_n\{b_1, b_2, \ldots, b_k\}$ where there is an operation called a projection such that $p(a_ib_j)=a_i$. The fibered product 601 consists of only those pairs of product elements in the tensor product such that $f(a_i)=g(b_j)$. The net effect is that the fibered product 601 can be viewed as fibers from B 605 over elements of A 603, where the base in A 603 is the set of elements from C 607 pulled back to A 603 by morphism f 609. Such a "pulling back" operation is accomplished by generating, for each element in C 607, the set of elements in A 603 which have this particular element as their image. This essentially "inverts" the morphism f, and is called the pullback of C along f. Likewise from the point of view of B 605, the fibers are made up of those elements of A 603 that are pulled back from C 607 along morphism f 609, over a base that is pulled back to B 605 from C 607 along morphism g 611. Thus, the fibered product 601 consists of all pairs $\{a_ib_j\}$ with $f(a_i)=c_k=g(b_j)$ for some $c_k$ in C 607.

Figure 6B:
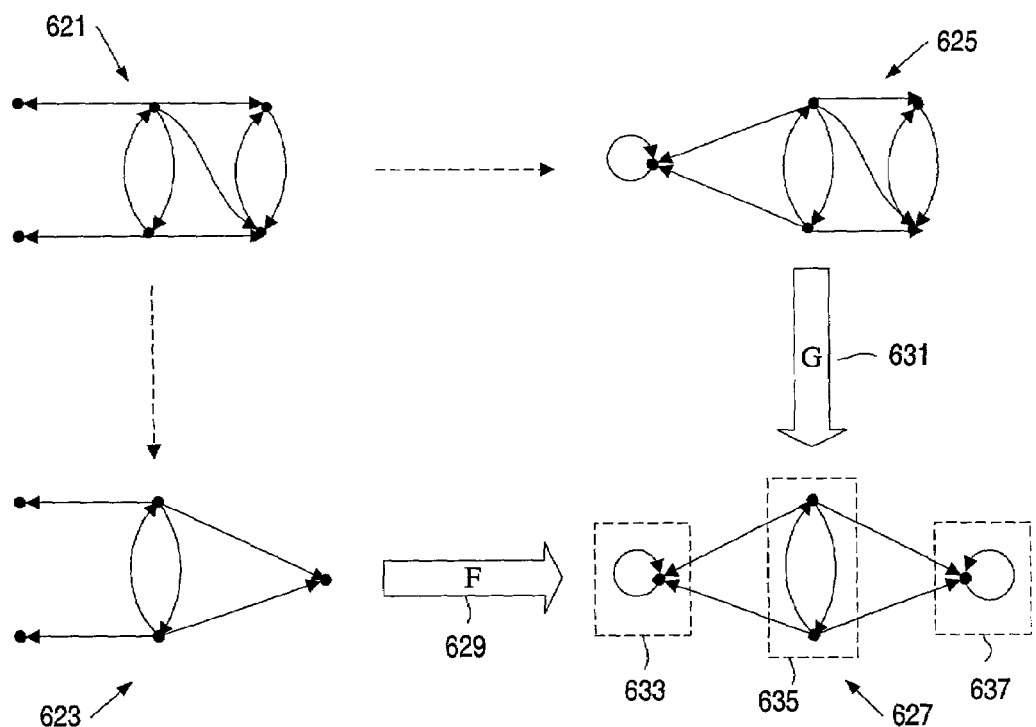

FIG. 6B illustrates a pullback operation using the input and resulting graphs from FIG. 1. The alphabet graph 627 specifies how the input graph 623 will be interpreted. The morphisms F 629 and G 631 map objects from the input graph 623 and rule graph 625, respectively, to three parts of the alphabet graph 627. All parts of the input graph 623 which are not affected by the rewriting operation are mapped to a context part 633. The new material on the rule graph 625, and the node to be modified from the input graph 623, are mapped onto an unknown node 637. The unknown node 637 is a variable, represented by a loop, so that it will match any valid rule for its node type and edge label. A neighborhood, or interface part 635, represents all of the possible nodes connected to the unknown node 637. Typically, the rule graph 625 consists of the context 633 and interface 635 of the alphabet graph 627, otherwise modifications may occur in places other than the unknown node 637.

In practice, the resulting graph 621 contains an object (node or edge) from the input graph 623 if that object maps to an object in the alphabet graph 627 for which there is also an object mapped from the rule graph 625. When the unknown part 637 of the alphabet graph 627 is a node, as illustrated in FIG. 6B, the mapping from the input node and rule node is called a filter. If the inverse image of the unknown node on the alphabet graph under the chosen filter is a single node on the input graph, the pullback operation rewrites that node with the corresponding portion of the rule graph, usually replacing it with a more complex graph structure. In general, if the maps to the alphabet graph are not filters, then multiple nodes may be rewritten, and a whole section of the input graph changes.

Thus, the edges that exist in the resulting graph are precisely those in the rule and input graphs that have something in common: they are mapped to the same basic type of edge in the alphabet graph. Indeed, if there is no mapping of one or the other to some edge in common, there will be no such relation between nodes in the resulting graph. This enforces the rule that if a node is changed in such a way that some of its old relations are no longer valid, the new graph will not have these relations present. Likewise, if there is only a partial match of the nodes of the input with those of the rule, then those non-matching nodes of the rule are not transposed onto the output. This introduces a new form of restriction, loosely formulated as follows: The only relations that are allowed between a pair of entities that are nodes of a graph are those which may be mapped to edges between the nodes these entities map to on the appropriate alphabet graph.

Figure 6E:
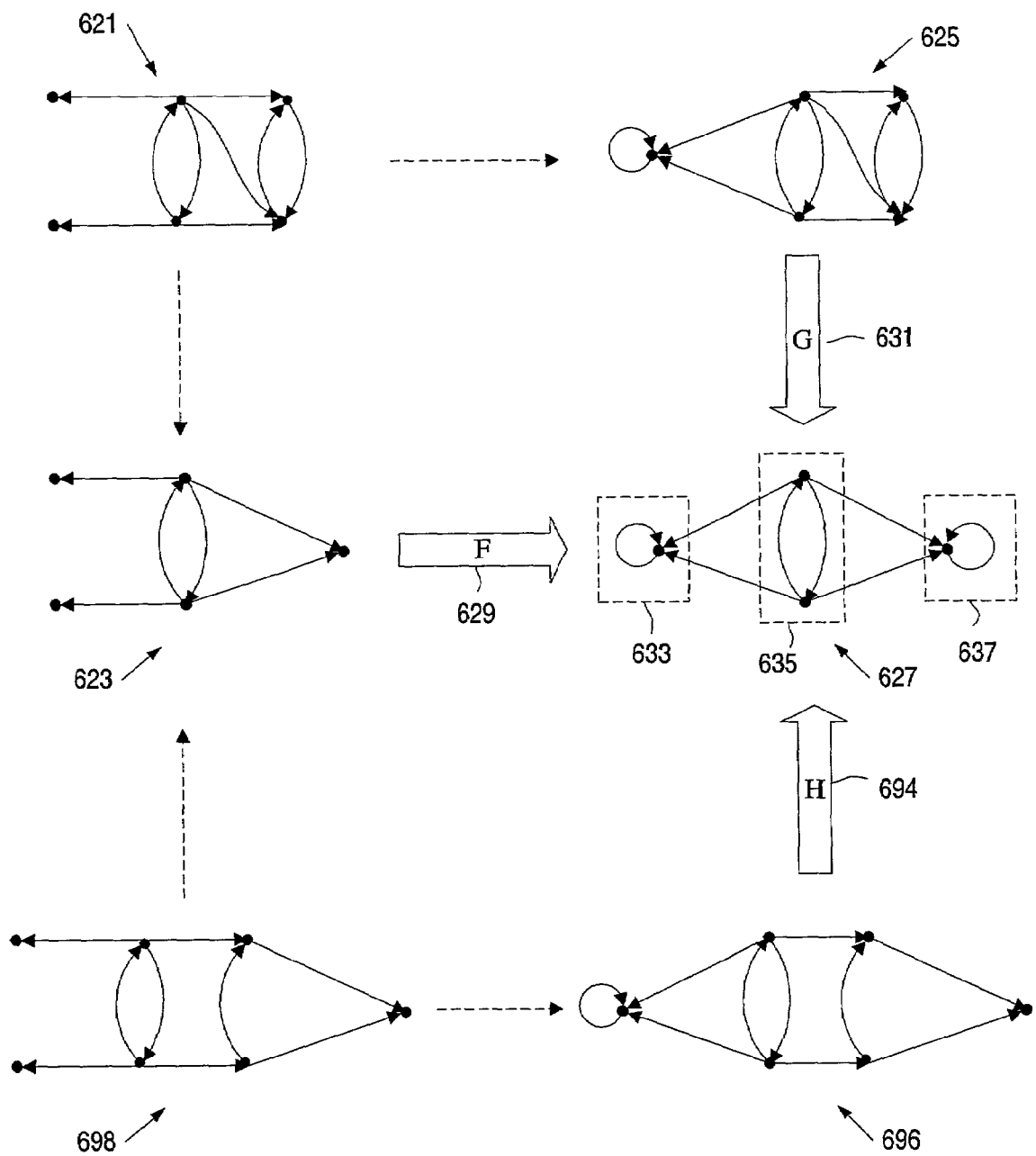

A double pullback (DPB) performs a cut and paste operation as illustrated in FIGS. 6D and 6E. In FIG. 6D, the top pullback square collapses part of an input graph 681 into a node in graph A 683, leaving the remainder of the input graph 681 unchanged. The bottom pullback glues those portions of graph D 693 that map to the unknown of graph C 687 (through morphism h 695) onto the collapsed node in graph A 683 to create an output graph 697 in the same fashion as described above for the single pullback. Thus in FIG. 6E, input graph 621 is partially collapsed into graph A 623 and the nodes and edges of graph 696 that map to unknown 637 in graph 627 are mapped to the collapsed node in graph A 623, resulting in output graph 698.

Adjacency matrices may be used in rewriting graphs as well as in graph matching. In an example illustrated in FIG. 6C, the pullback operation of FIG. 6A is performed on the graphs and morphism from FIG. 3B. Input graph 643 and alphabet graph 647 correspond to graphs A and C in the pullback operation of FIG. 6A, and morphism F 301 corresponds to morphism f. Rule graph 649 (corresponding to graph B) contains nodes 1 651, 3 653 and 2 655 that are connected through edges 5 659 and 6 657. The rule graph 649 is mapped to the alphabet graph 647 using morphism G 661. The tensor product of the graphs A 643 and B 649 is a set of nodes of the form ab, together with a set of edges e1e2, where e1 is an edge from A 643, and e2 is an edge from B 649. The adjacency matrix of A 643 is represented in Table 1-B above. A similar matrix can be written for B as shown in Table 2. The tensor product of the two matrices is matrix in which each entry a in the adjacency matrix for A 643 is replaced by a subblock ab of entries starting with a and ending with each element from B 649. Since A has a 3×3 adjacency matrix, and B has a 3×3 adjacency matrix, the new matrix will be This is known as a Kronecker or tensor product of two matrices, and is widely used.

TABLE 2

| B | 1 | 2 | 3 |
|---|---|---|---|
| 1 | 0 | 1 | 1 |
| 2 | 1 | 0 | 0 |
| 3 | 1 | 0 | 0 |

The fibered product represented by graph 641, which is the output of the product of the input graph 643 and the rule graph 649 over the alphabet graph 647, has as its nodes only the nodes in the tensor product whose a and b entries are mapped to the same place on the alphabet graph. The fibered product has as its edges, likewise, only those edges mapped to the same edge in the alphabet.

However, the tensor product and matrix operations are very intensive and generate too much graph. Like the alphabet and rule graphs, the input graph can be divided into context, interface, and unknown parts. Since the context part is unaffected, and, algorithmically, is unimportant in rewriting, in an alternate embodiment only the interface nodes and edges, and the unknowns are used to construct adjacency matrices. The parts of the input and rule graphs that map to the unknown and interface of the alphabet graph are referred to as "pre-images." Assuming f and g are partial morphisms for morphism F 301 and G 661 that include only the interface and unknown parts, and v and e represent nodes and edges respectively, each of these functions, fv,fe (and their counterparts) defines a set of arrows between the objects (nodes or edges) in the input (rule) graph and the corresponding nodes (edges) on the alphabet graph. These objects and arrows define a bipartite graph that can be written as adjacency matrix, with the sources of fv(fe) as rows and the targets as columns. The matrix for Afv (Afe) is shown in Table 3-A and its counterpart Bgv(Bge) in Table 3-B. The matrix Afv * BgvT has a 1 wherever the corresponding pair form a product node. Likewise the matrix Afe * BgeT contains a 1 for each edge. The product matrix can be read off the two resultants, producing the resulting graph 641 that contains nodes a1 679, b3 663, b2 665, c3 667 and c2 669, and edges f6 671, f5 673, d6 675 and d5 677.

TABLE 3-A

|   | x | y | z | w |
|---|---|---|---|---|
| a | 1 | 0 | 0 | 0 |
| b | 0 | 1 | 0 | 0 |
| c | 0 | 1 | 0 | 0 |
| d | 0 | 0 | 1 | 0 |
| e | 0 | 0 | 0 | 1 |
| f | 0 | 0 | 1 | 0 |

TABLE 3-B

|   | 1 | 2 | 3 | 4 | 5 |
|---|---|---|---|---|---|
| x | 1 | 0 | 0 | 0 | 0 |
| y | 0 | 1 | 1 | 0 | 0 |
| z | 0 | 0 | 0 | 1 | 1 |
| w | 0 | 0 | 0 | 0 | 0 |

Figure 7:
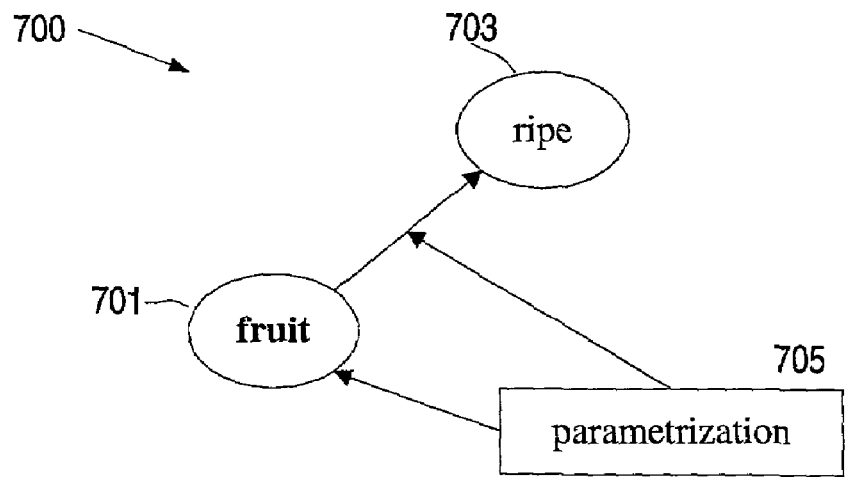
FIG. 7 is an example of node replacement by the graphical rewriting system of FIG. 1.
Figure 7:
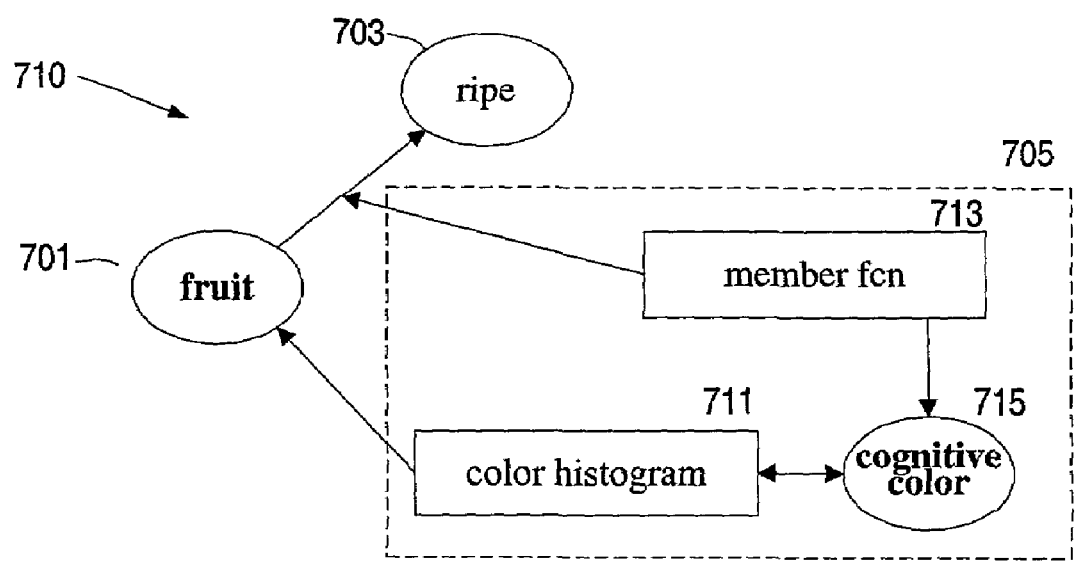

An example of node replacement is illustrated in FIG. 7. The input graph 700 is a starting graph for a user that wants to find multimedia content that describes how to determine when a piece of fruit is ripe. The input graph 700 contains three nodes, fruit 701, ripe 703, and parameterization 705. During the graph rewriting process 707, the input graph 700 is matched with an alphabet graph in the GCS that parameterizes the same structure. Applying the associated rule graph to the input graph 700 results in graph 710 in which the parameterization node 705 has been replaced by a more complex structure that relates perceived color to the ripeness of a piece of fruit. The resulting graph 710 can now be used to search for content that describes the ripe colors of various types of fruit. The new structure is interpreted as a parameterization of the relationship between the fruit and the property "ripe". In MPEG-7 practice, the parameter values vary from zero to one, but they may take any range. This value is interpreted as the value of the membership of "fruit" and "ripe" in the relation "property of". A relation is formally a set, and this membership function is a measure of fuzzy set membership. It is a function of color 715, in this example, so it is embodied by a Semantic State called "Member function" 713. As the color of the fruit, described in the color histogram 711, varies from, for example, green to brown, the membership value varies from zero to one, indicating that the fruit is most ripe when it is brown, and least ripe when it is green. Another example could have applied another eligible rule, say one which parameterized the ripeness of fruit by a membership function and a "softness" value.

MPEG-7 defines descriptors and description schemes in terms of XML (extensible markup language) elements. The following exemplary alphabet graph has an unknown node that allows objects or events, SemanticPlace or SemanticTime, in configurations where the object or event is located at the place and/or the object/event exists for a given duration. The alphabet graph is constructed as a single node, meaning that there is an implicit context node, and that relations between the unknown and the context are unrestricted. The implicit context node takes any type, has any links, and is linked to the unknown node by all edge relations.

```
<Graph name="Place and Duration">
    <Graph id="unknown1" />
        <Node id="object"/>
        <Node id="event"/>
        <Node id="SemanticPlace"/>
        <Node id="SemanticTime"/>
        <Relation ObjectSemanticPlace />
        <Relation ObjectSemanticTime />
        <Relation EventSemanticPlace />
        <Relation EventSemanticTime />
    </Graph>
</Graph>
```

The associated exemplary rule graph adds SemanticPlace to an Object and allows any object to have a SemanticPlace attached to it, with a relation of "LocationOf". Note that, as it is written, there is no restriction to the number of such SemanticPlaces that are added to the original object, so the rule may be applied an unlimited number of times.

```
<Graph>
    <Node id="SemanticPlace" />
    <Node id="Object" />
    <Relation source="SemanticPlace" target="Object" type="locationOf" />
    <ControlledTerm ClassificationSchemeLocation=...
        TermIdentifier="Place and Duration" />
    <Relation source="Object" target="unknown1" type="ruleMorphism" />
    <Relation source="LocationOf" target="unknown1"
        type="ruleMorphism"/>
</Graph>
```

An unknown as in the above example may be frequently used, so it can be built of smaller "words" and a classification scheme of unknowns may be stored for subsequent use. The unknown node is a "match objects, events, place and duration, with allowed edges between place and object, between duration and object, and likewise for events" node. It can be used for elements of an alphabet graph other than the unknown. As interface or context, it provides restrictions on what may be attached to the unknown when the rule is applied. Multiple object and event nodes may be mapped to the unknown on a single operation (operations in parallel), is written. It will be appreciated that context need not be implicit as in the present example, but may be explicitly added to restrict what kind of relations or datatypes may occur in the rest of the graph. In one embodiment, since there is only one context in an alphabet graph its identifier and name is "context."

While the above example uses object and event as abstractions and provides very general rules (in fact, giving rules for datatypes), the invention is not so limited. For example, the following alphabet and rule graphs allow any male and female to become married.

```
<Graph id="interface" >
    <Node id="female"/>
    <Node id="male" />
</Graph>
</Graph id="unknown" >
    <Node Event="ceremony" />
    <Node Event="courtroomDance" />
</Graph>
<Graph>
    <Node id="Bride" />
    <Node id="Groom" />
    <Node Event=marriage />
    <Relation source="Bride" target="marriage" type=participatesIn />
    <Relation source="Groom" target="marriage" type="participatesIn" />
</Graph>
<ControlledTerm schemeLocation="someURI" scheme="someScheme"
        term="someAlphabetGraph" />
<Graph>
    <Relation source="bride" target="unknown" type="ruleMorphism" />
    <Relation source="groom" target="unknown" type="ruleMorphism" />
    <Relation source="marriage" target="unknown" type="ruleMorphism" />
    <Relation source="participatesIn" target="unknown"
        type="ruleMorphism" />
</Graph>
``` but in this case, they need to be disjoint because there are no relations between the objects and events in the alphabet. All connections between them must go through the context. In The various graphs used by the present invention are nested within a graphical classification scheme description scheme (GCS DS), which is defined as follows:

```
<complexType name="GraphicalClassificationScheme"
    <complexContent>
        <extension base="mpeg7: ClassificationSchemeType">
        <attribute name="strict" type="boolean" use="required" default="false" />
        </extension>
    </complexContent>
</complexType>
``` an alternate embodiment, the adjacency matrix is also stored by assigning numerical values to all the edges and nodes in the alphabet and rule graphs in the order in which the graph This scheme allows the setting of the attribute "strict" to require that all correspondences to the alphabets in this scheme are to be "equal to," corresponding to an exact match. Other attributes may be specified to implement inexact matches.

An optional "name" field is added to a graph type descriptor scheme entry in the GCS DS to specify the type of field which is represented by a particular node. Therefore a "name" field is added for this purpose. The name of this field is consistent with the field which gives the data type of the corresponding Relation.

```
<complexType name="GraphType">
  <complexContent>
    <extension base="mpeg7:DSType">
      <choice minOccurs="0" maxOccurs="unbounded">
        <element name="Node">
          <complexType>
            <complexContent>
              <extension base="mpeg7:ReferenceType">
                <attribute name="id" type="ID" use="optional"/>
                <attribute name="name" type="string" use "optional"/>
              </extension>
            </complexContent>
          </complexType>
        </element>
        <element name="Relation" type="mpeg7:RelationBaseType"/>
      </choice>
    </extension>
  </complexContent>
</complexType>
```

The template, alphabet, rule and morphism graphs are defined in a Graphical Term Definition descriptor that appears as an entry in the GCS DS. An "alphabetGraphRef" element is used to specify an alphabet graph that is the target of a graph morphism. In addition, the different graph grammars for a particular rule are specified through an optional attribute "production." Valid values for the production attribute are PB (pullback), PO (pushout), DPB (double pullback), and DPO (double pushout).

```
<complexType name="GraphicalTermDefinitionType">
  <complexContent>
    <extension base="mpeg7:TermDefinitionBaseType">
      <choice minOccurs="1" maxOccurs="unbounded">
        <element name="templateGraph" type="mpeg7:GraphType"/>
        <element name="alphabetGraph" type="mpeg7:GraphType"/>
        <element name="ruleGraph" type="mpeg7:GraphType"/>
        <element name="alphabetGraphRef"
            type="mpeg7:TermUseType"/>
        <element name="morphismGraph" type="mpeg7:GraphType"/>
      </choice>
      <attribute name="termId" type="NMTOKEN" use="required"/>
      <attribute name="production" type="string" use="optional"/>
    </extension>
  </complexContent>
</complexType>
```

The morphism graph is derived from a standard graph type and includes elements defining the source graph of the morphism ("SourceGraphRef"), a term reference to the source graph ("SourceGraphTermRef"), a reference to the target graph of the morphism ("TargetGraphRef"), and a term reference to the target graph ("TargetGraphTermRef").

```
<complexType name="MorphismGraphType">
  <complexContent>
    <extension base="mpeg7:GraphType">
      <choice minOccurs="1">
```

-continued

```
    <element name="SourceGraphRef" type="mpeg7:Reference"/>
    <element name="SourceGraphTermRef"
        type="mpeg7:TermUseType"/>
  </choice>
  <choice minOccurs="1">
    <element name="TargetGraphRef" type="mpeg7:Reference"/>
    <element name="TargetGraphTermRef"
        type="mpeg7:TermUseType"/>
  </choice>
 </extension>
 </complexContent>
</complexType>
```

One embodiment of a computer system suitable for use as the graphical rewriting system 101 is illustrated in FIG. 8. The computer system 40, includes a processor 50, memory 55 and input/output capability 60 coupled to a system bus 65. The memory 55 is configured to store instructions which, when executed by the processor 50, perform the methods described herein. The memory 55 may also store the multimedia content and descriptions. Input/output 60 provides for the delivery and display of multimedia content or portions or representations thereof. Input/output 60 also encompasses various types of computer-readable media, including any type of storage device that is accessible by the processor 50. One of skill in the art will immediately recognize that the term "computer-readable medium/media" further encompasses a carrier wave that encodes a data signal. It will also be appreciated that the computer system 40 is controlled by operating system software executing in memory 55. Input/output and related media 60 store the computer-executable instructions for the operating system and methods of the present invention as well as the multimedia content. It will be further appreciated that input/output 60 may include a network interface that connects the system 40 to a communications network, such as the Internet.

The description of FIG. 8 is intended to provide an overview of computer hardware and other operating components suitable for implementing the invention, but is not intended to limit the applicable environments. It will be appreciated that the computer system 40 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

The particular methods of the invention are described in terms of computer software with reference to a series of flow diagrams in FIGS. 2 and 4. The methods constitute computer programs made up of computer-executable instructions illustrated as blocks (acts) 201 until 217 in FIG. 2 and blocks 401 until 415 in FIG. 4. Describing the methods by reference to a flow diagram enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will be appreciated that more or fewer processes may be incorporated into the methods illustrated in FIGS. 2 and 4 without departing from the scope of the invention and that no particular order is implied by the arrangement of blocks shown and described herein.

Although specific embodiments of a graph rewriting system have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computerized method of graph rewriting, a graph having nodes representing entities and edges between the nodes representing relationships between entities, the method comprising:
    comparing an input graph representing a description scheme for multimedia content with a set of pre-defined template graphs, the description scheme representing structure and semantics of the multimedia content, and the template graphs representing model description schemes; and
    validating the input graph when there is a match with a template graph.

2. The computerized method of claim 1, wherein the comparing uses a graph matching process.

3. The computerized method of claim 2, wherein the comparing comprises:
    creating adjacency matrices representing the input graph and the set of template graphs.

4. The computerized method of claim 1 further comprising:
    evaluating the input graph against a set of pre-defined alphabet graphs; and
    applying a rule associated with a matching alphabet graph to the input graph, the rule represented by a rule graph and a set of morphism graphs.

5. The computerized method of claim 4, wherein the evaluating uses a graph matching process.

6. The computerized method of claim 5, wherein the evaluating comprises:

creating adjacency matrices for the input graph and the set of alphabet graphs.

7. The computerized method of claim 4, wherein the applying comprises:
performing a pushout operation.

8. The computerized method of claim 4, wherein the applying comprises:
performing a pullback operation.

9. The computerized method of claim 8, wherein performing the pullback operation comprises:
creating adjacency matrices representing smallest portions of the set of morphism graphs that map the input and rule graphs to the alphabet graph using pre-images of parts of the alphabet graph marked for change; and
multiplying the adjacency matrix associated with the input graph by a transpose of the adjacency matrix associated with the rule graph.

10. A computer-readable medium having executable instructions to cause a computer to perform a method of graph rewriting, a graph having nodes representing entities and edges between the nodes representing relationships between entities, the method comprising:
comparing an input graph representing a description scheme for multimedia content with a set of pre-defined template graphs, the description scheme representing structure and semantics of the multimedia content, and the template graph representing model description schemes; and
validating the input graph when there is a match with a template graph.

11. The computer-readable medium of claim 10, wherein the comparing uses a graph matching process.

12. The computer-readable medium of claim 11, wherein the comparing comprises:
creating adjacency matrices representing the input graph and the set of template graphs.

13. The computer-readable medium of claim 11, wherein the method further comprises:
evaluating the input graph against a set of pre-defined alphabet graphs; and
applying a rule associated with a matching alphabet graph to the input graph, the rule represented by a rule graph and a set of morphism graphs.

14. The computer-readable medium of claim 13, wherein the evaluating uses a graph matching process.

15. The computer-readable medium of claim 14, wherein the evaluating comprises:
creating adjacency matrices for the input graph and the set of alphabet graphs.

16. The computer-readable medium of claim 13, wherein the applying comprises:
performing a pushout operation.

17. The computer-readable medium of claim 13, wherein the applying comprises:
performing a pullback operation.

18. The computer-readable medium of claim 17, wherein performing the pullback operation comprises:
creating adjacency matrices representing smallest portions of the set of morphism graphs that map the input and rule graphs to the alphabet graph using pre-images of parts of the alphabet graph marked for change; and
multiplying the adjacency matrix associated with the input graph by a transpose of the adjacency matrix associated with the rule graph.

19. A system configurable for graph rewriting, a graph having nodes representing entities and edges between the nodes representing relationships between entities, the system comprising:
a processor coupled to a memory through a bus; and
a validation process executed by the processor from the memory to cause the processor to compare an input graph representing a description scheme for multimedia content with a set of pre-defined template graphs, and to validate the input graph when there is a match with a template graph, wherein the description scheme represents structure and semantics of the multimedia content, and the template graphs represent model description schemes.

20. The system of claim 19, wherein the validation process causes the processor to execute a graph matching process from the memory to compare the input graph and the template graphs.

21. The system of claim 20, wherein the validation process further causes the processor to create adjacency matrices for the input graph and the set of template graphs to compare the input graph and the template graphs.

22. The system of claim 19, further comprising a modification process executed by the processor from the memory to cause the processor to evaluate the input graph against a set of pre-defined alphabet graphs, and to apply a rule associated with a matching alphabet graph to the input graph, wherein the rule is represented by a rule graph and a set of morphism graphs.

23. The system of claim 22, wherein the modification process further causes the processor to execute a graph matching process from the memory to evaluate the input graph.

24. The system of claim 23, wherein the modification process further causes the processor to create adjacency matrices for the input graph and the set of alphabet graphs to evaluate the input graph.

25. The system of claim 22, wherein the modification process further causes the processor to perform a pushout operation to apply the rule.

26. The system of claim 22, wherein the modification process further causes the processor to perform a pullback operation to apply the rule.

27. The system of claim 26, wherein the modification process further causes the processor to create adjacency matrices representing smallest portions of the set of morphism graphs that map the input and rule graphs to the alphabet graph using pre-images of parts of the alphabet graph marked for change, and to multiply the adjacency matrix associated with the input graph by a transpose of the adjacency matrix associated with the rule graph to perform the pullback operation.

* * * * *